Nov. 7, 1939.  L. K. BOTNEN  2,178,716
CORN PLANTER
Filed Nov. 5, 1937  2 Sheets-Sheet 1
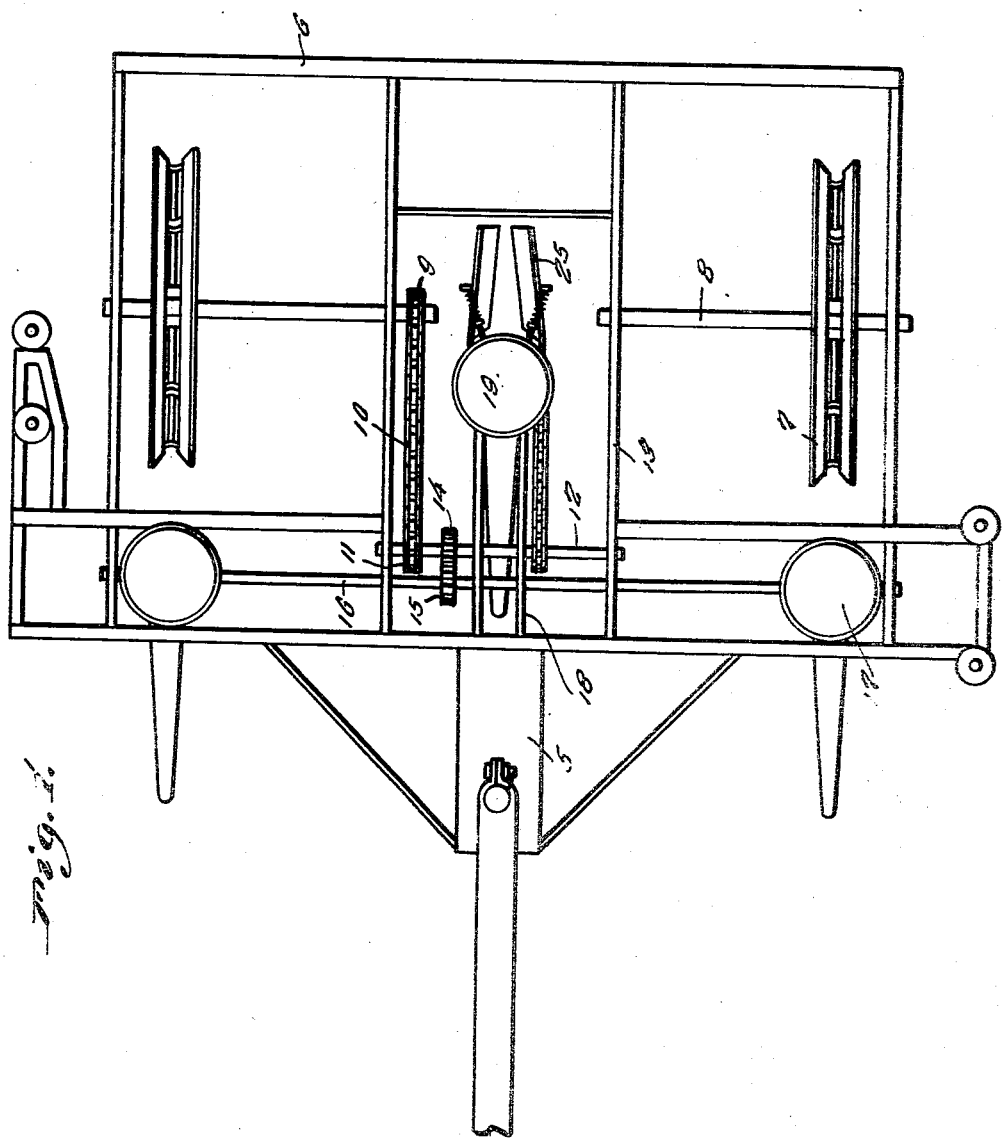
Inventor
L. K. Botnen
By Clarence A. O'Brien
Hyman Berman
Attorneys

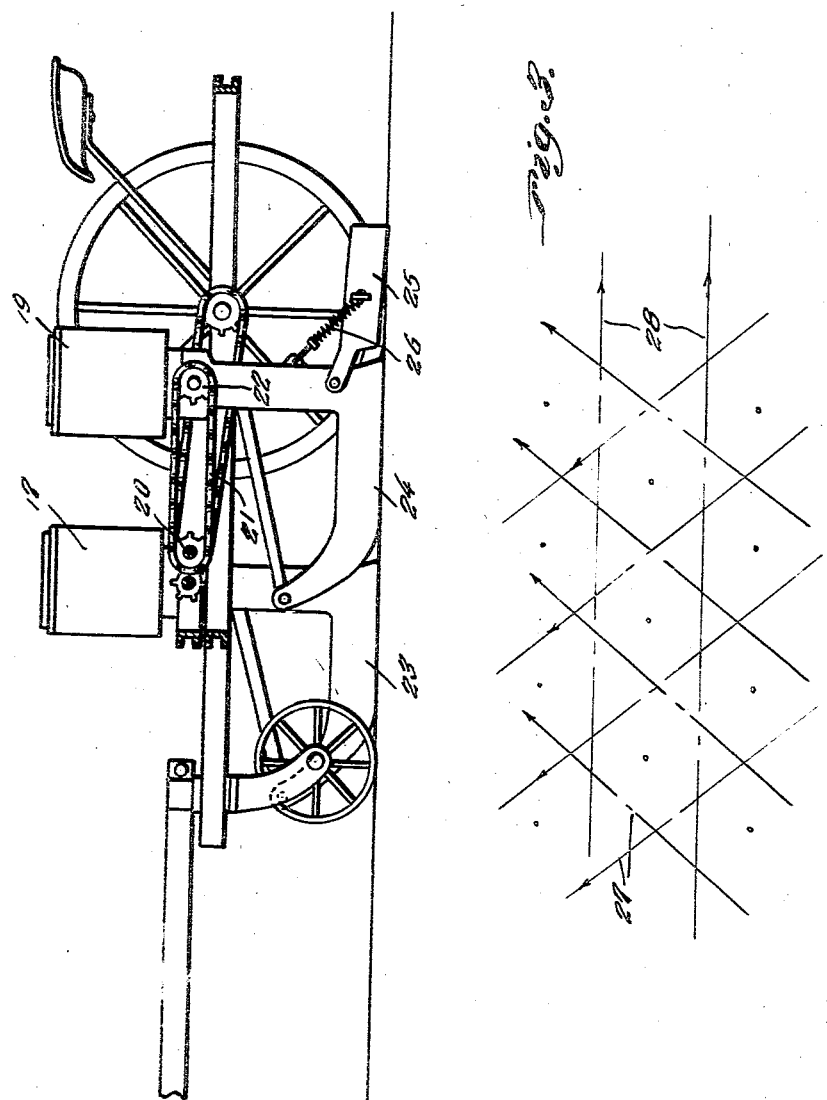

Patented Nov. 7, 1939

2,178,716

UNITED STATES PATENT OFFICE 2,178,716

CORN PLANTER

Lewis K. Botnen, Marshalltown, Iowa

Application November 5, 1937, Serial No. 173,026

1 Claim. (Cl. 111—52)

The present invention relates to corn planters and has for its primary object to provide an intermediate planting mechanism and embodying a dropper offset rearwardly from the regular droppers mounted on the machine by means of which an intermediate row of corn is planted in hills which are staggered with respect to the adjacent side rows and by means of which the corn may be cultivated in a direction diagonally with respect to the field as well as longitudinally thereof.

A further object is to provide a corn planter adapted for planting the corn in the aforesaid manner and which is of simple and practical construction, which does not necessitate any material changes or alterations in the conventional type of planter, which is efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view.

Figure 2 is a side elevational view and

Figure 3 is a diagrammatic view of the rows of corn planted in accordance with the present invention and illustrating the manner of cultivating the same.

Referring now to the drawings in detail, the numeral 5 designates a corn planter of conventional construction, which includes a frame 6 having the usual planter wheels 7 mounted on axles 8, one of said axles having a sprocket 9 for driving a chain 10 trained about a sprocket 11 on a transversely extending shaft 12 having its ends journaled in a pair of spaced parallel longitudinally extending frame members 13. The shaft 12 is provided with a spur gear 14 operatively engaging a similar gear 15 mounted on a transversely extending shaft 16 having its opposite ends extending into a pair of planter hoppers 17 positioned adjacent the opposite sides of the frame 6 as will be apparent from an inspection of Fig. 1 of the drawings. Between the frame members 13 is positioned a pair of longitudinally extending frame members 18 upon which an intermediate planter hopper 19 is supported, said intermediate hopper 19 being positioned equidistantly between the hoppers 17 and rearwardly thereof. The shaft 12 is provided with a sprocket 20 for driving a chain 21 extending about a sprocket 22 arranged adjacent the intermediate hopper 19 and adapted for operating the dropper mechanism associated therewith.

Each of the hoppers 17 has shoes 23 associated therewith and extending forwardly thereof and the hopper 19 is provided with a similar shoe 24. The hoppers 17 are positioned forwardly of the respective wheels 7 and in longitudinal alignment therewith, said wheels being of conventional construction for covering the corn as the same is dropped from the hoppers.

At each side of the shoe 24 are pivotally mounted the forward ends of a pair of scrapers 25, the rear ends of which converge and terminate in spaced relation as will be apparent from an inspection of Fig. 1 of the drawings. Expansible coil springs 26 connect each of the scrapers 25 with the shoe 24. These scrapers 25 serve the same function as the wheels 7 for covering the corn dropped from the hopper 19.

In practice the side hoppers 17 are positioned substantially 6 feet apart and since the intermediate hopper 19 is positioned substantially equidistantly therebetween the rows of corn will be planted substantially 3 feet apart. The intermediate hopper 19 is positioned rearwardly of the hopper 17 a distance of approximately 18 inches and accordingly the hills of corn will be placed approximately 3 feet 6 inches apart. In this manner by cultivating the corn in a direction diagonally of the field as shown by the lines 27 in Fig. 3 of the drawings a greater distance will be provided for cultivating purposes between the hills of corn than would be possible by cultivating the same in a longitudinal direction as shown by the lines 28. Accordingly while adequate space is provided between the hills for the proper growing of the corn, at the same time an additional row of corn is planted, which otherwise would be impossible.

It is believed the details of construction, operation and advantages of the invention will be readily understood from the foregoing without further detailed explanation.

What is claimed is:

A corn planter of the class described comprising a frame, a pair of transversely aligned shafts journaled in the frame, ground wheels carried by the shafts, a pair of corn planting mechanisms mounted on the frame in advance of and in alignment with the wheels to permit the latter to cover corn dropped thereby, a long transversely arranged shaft journaled in the frame and connected with the feeding means of the planting mechanisms, a short transversely extending shaft journaled in a central part of the frame, gears connecting the two shafts together, a chain and sprocket for driving the short shaft from one of the wheel carrying shafts, a third planting mechanism mounted on the frame rearwardly of the first-named planting mechanisms and at an equal distance from both the first-named planting mechanisms, a chain and sprockets connecting the short shaft with the feeding means of the third planting mechanism and seed covering means for covering the corn dropped by the third planting mechanism.

LEWIS K. BOTNEN.